June 13, 1933.  J. C. SKARSTAD  1,913,731
MILK AND CREAM COOLER AND AERATOR
Filed July 3, 1930
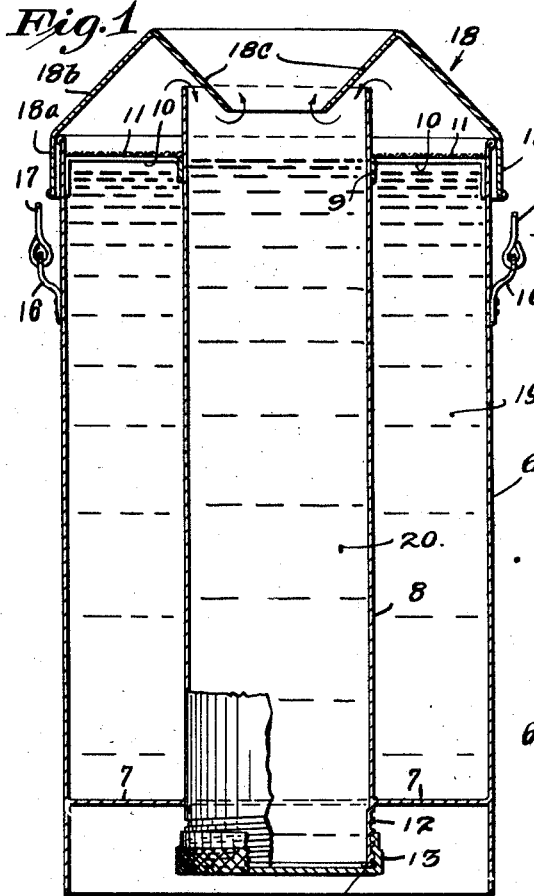
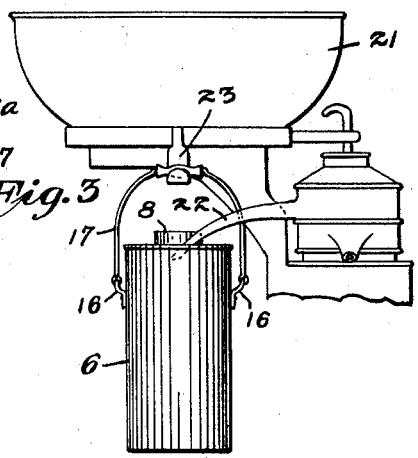
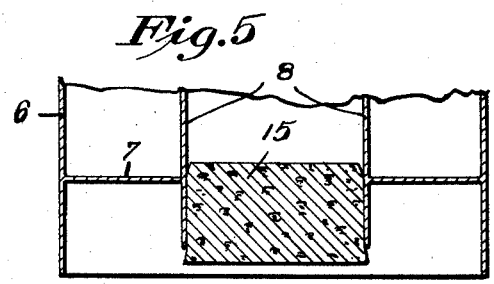
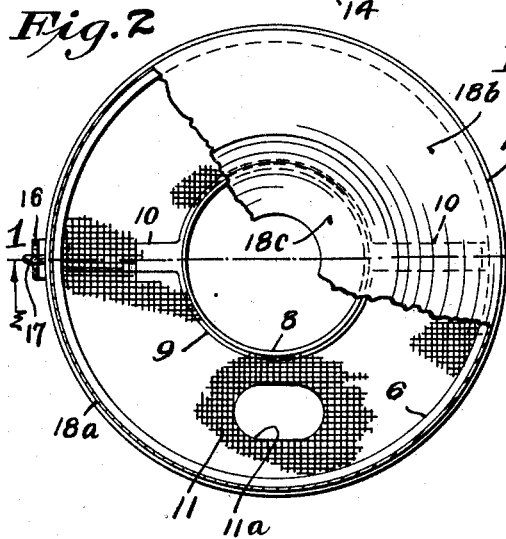
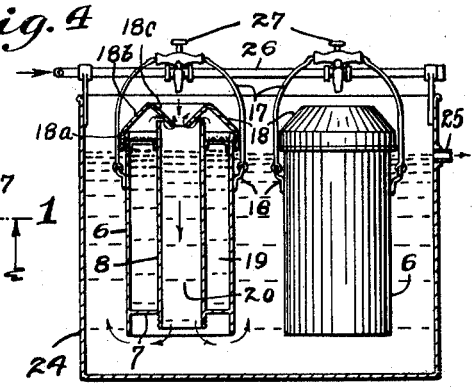
Inventor
James Clarence Skarstad
By his Attorneys
Williamson & Williamson Patented June 13, 1933

1,913,731

UNITED STATES PATENT OFFICE

JAMES CLARENCE SKARSTAD, OF WINONA COUNTY, MINNESOTA

MILK AND CREAM COOLER AND AERATOR

Application filed July 3, 1930. Serial No. 465,487.

This invention relates to coolers and aerators for milk and cream.

It is the object of this invention to provide a novel and improved cooler and aerator of cheap and simple construction which can be effectively used to carry off the animal heat from milk and cream to prevent the development of undesirable bacteria in the milk and cream.

To this end, the invention consists in the novel parts and novel combinations of parts, hereinafter defined in the claims and described in the following specification, made in connection with the accompanying drawing, wherein like reference characters refer to the same or similar parts throughout the various views, and in which, Fig. 1 is a view taken chiefly in vertical section through the cooler and aerator substantially on the line 1—1 of Fig. 2, the bail handle being broken away;

Fig. 2 is a plan view of the cooler and aerator, certain parts of the cover being broken away to more clearly show the construction of the device;

Fig. 3 is a view in side elevation of the can with the cover removed applied to portions of a cream separator;

Fig. 4 is a vertical section through a tank in connection with which the coolers and aerators may be used, a pair of the devices being illustrated and one of them being shown in vertical section and the other in side elevation, and Fig. 5 is a vertical section through the lower portion of a device and illustrating a slightly different type of closure for the central tube than the type illustrated in Figs. 1 and 4.

Referring to the drawing, and in accordance with the present invention, a can 6 is provided preferably of cylindrical shape and this can has a bottom 7 spaced upwardly from the lower end of the can and the can is preferably provided with a bead at its top edge. Centrally mounted in the can 6 and projecting upwardly some little distance above the top of the can and extending through the bottom 7 some little distance below the bottom but in upwardly spaced relation from the lower edge of the can, is a large tube 8. The upper end of the tube 8 is centered in the can by means of a ring 9 encompassing the tube and secured to the sides of the can by means of arms 10. Applied between the tube 8 and the sides of the can, and resting on the arms 10 is an annular screen 11 which preferably is provided with an elipse shaped opening 11a to receive the discharge spout of a cream separator. The lower end of the tube 8, as shown in Figs. 1 and 4, may be provided with exterior threads 12 to receive a cap 13 carrying a washer 14 and adapted to be seated tightly against the lower end of the tube to close the same. If desired, however, the tube 8 instead of being screw-threaded at its lower end, may be smooth surfaced to receive a stopper 15 as shown in Fig. 5, formed from cork, or similar material. A pair of ears 16 are secured to the outer side of the can at diametrical points to receive a bail shaped handle 17.

A cover 18 for the can is provided and this cover includes a substantially cylindrical portion 18a having a lower beaded edge, an upwardly and inwardly extending frustro-conical portion 18b and a downwardly and inwardly extending frustro-conical or funnel-like portion 18c joining the portion 18b. When the cover 18 is applied to the top of the can 6, the beaded upper edge of the can will make a close fit with the cover at points where the portion 18a joins the portion 18b and the funnel-like portion 18c will project downwardly into the upper end of the tube 8 a short distance below the top edge thereof. The funnel like portion 18c will also be inwardly spaced from the upper end of the tube 8.

It will be seen that an annular chamber 19 is formed between the tube 8 and the side walls of the can 6 and this chamber may be used for receiving and holding milk or cream. The tube 8 will also form a chamber 20 which may or may not be closed, as desired, by the cap 13 or the plug 15. When the cover 18 is applied to the can, it will be seen that there is a free passage provided for the circulation of air from the top of chamber 19 outwardly through the central opening in the cover.

In Fig. 3, portions of a cream separator are illustrated including the bowl 21, discharge spout 22 and hook bracket 23 for supporting the bail handle of a can. It is, of course, very desirable in handling milk and cream that the milk and cream be cooled as quickly as possible after the milk is taken from the cow and separated. This is desirable in order that the animal heat in the milk and cream may be removed to prevent the development of obnoxious bacteria in the same.

With the present device, the milk and cream can be cooled immediately as it is drawn off from the separator. Before separating the milk and cream, the cover 18 of the cooler and aerator will be removed and the cap 13 or plug 15 will be applied to the tube 8 to close the lower end of the chamber 20. Cold water or ice may then be applied within the chamber 20 to fill the same, whereupon the spout 22 may be fitted within the opening 11a in the screen 11 and the cooler may be supported by the handle 17 from the hook 23 of the separator. The cream or milk may then be run from the separator directly into the chamber 19 and the cold water or ice in the chamber 20 will act to carry off a great deal of the animal heat of the cream or milk. The screen 11 will prevent flies, bugs and other insects from obtaining access to the cream or milk. After the milk and cream have been separated, the cover 18 may be applied to the can 6 and the can may be supported as illustrated in Fig. 4 within a cooling tank. The tank 24 illustrated has a drain pipe 25 adjacent its upper end and cold water is carried to the tank by means of a water conduit 26 having any desired number of valve controlled faucets 27 attached thereto, the said faucets preferably being provided with hooks for supporting the bail handles of cans. Before the cooler and aerator of the present invention is lowered into the tank 24, the cap 13 or plug 15 will be removed so that the lower end of the chamber 20 will be open. The device may then be supported as illustrated in Fig. 4 from one of the faucets by means of bail handle 17 so that the central portion of the cover 18 will be disposed below the faucet. The faucet may then be turned on to cause cold water to circulate downwardly through the chamber 20 to the bottom of the tank. As the portion 18c of the cover projects inwardly from the upper end of the tube 8 and downwardly therefrom, it will be seen that no water will run into the chamber 19 from the faucet. The can will be supported so that its top edge is above the drain 25 to prevent the flow of water over the top of the can into the chamber 19. When the water in the tank 24 reaches the level of the drain 25, the cream or milk can be very rapidly cooled due to the fact that a stream of cold water circulates through the center of the body of milk or cream to absorb the animal heat of the same and also the cold water surrounds the can to absorb the heat of the milk or cream. As the coldest water from the faucet 27 is admitted to the top of the chamber 20, and as the warmest points in the body of the cream or milk is at the top of the chamber 19, it will be seen that a very efficient cooling action is obtained. Also due to the positioning of the drain 25 adjacent the top of the tank 24, the warmest water in the tank will be continually drained off so that the temperature in the water of the tank will remain low at all times. As there is a free passage for the circulation of air from the top of chamber 19 between the top of tube 8 and portion 18c of the cover and thence outwardly through the opening in the center of the cover, the cream or milk will be properly aerated and the gases and fumes from the cream or milk passing off from the same during the cooling process will be quickly carried away.

As the screen 11 may be readily removed after the cover 18 is taken off the can, it will be seen that all parts of the device can be readily washed and sterilized. The device is extremely simple in construction and the cream or milk can be cooled in much shorter time than with the ordinary type of cream or milk can. Of course, if a tank such as the tank 24 is not available, the cream or milk may be completely cooled by filling the chamber 20 with cold water or ice, after the cap 13 or plug 15 has been applied to the tube 8.

The present device has been successively demonstrated in actual practice. Although it is preferred to make the parts of the device circular in shape for ease in construction, it will be understood that the parts may be of any annular shape. It is, of course, possible to use the device for cooling other fluids or solid matter than milk or cream.

It will be understood that various changes may be made in the form, details, arrangement and proportions of the various parts without departing from the scope of the present invention.

What is claimed is:—

1. A milk and cream cooler and aerator comprising a can having side walls and a bottom, an open ended tube extending through the central portion of the can in inwardly spaced relation from the sides thereof and projecting through the bottom of the can, the space between said tube and said side walls forming a cream cooling chamber and said tube forming a cooling fluid chamber open at both ends, a cover adapted to be secured at the top of said can and having a downwardly and centrally extending funnel-shaped portion extending into the upper end of the said tube in spaced relation from the sides thereof.

2. The structure defined in claim 1, and means for closing the lower end of said tube.

3. A milk and cream cooler and aerator comprising a can, a tube disposed in central relation relative to the sides thereof, a cover fitting the top of the can and having a central portion projecting over the top of said tube and into said tube in inwardly spaced relation from the walls thereof, said central portion having an opening therethrough in communication with said tube, the space between said side walls and said tube forming a cream cooling chamber and said tube forming a cooling fluid chamber open at both ends, and a screen mounted in the upper end of said can between said tube and the walls of the can.

In testimony whereof I affix my signature.

JAMES CLARENCE SKARSTAD.